United States Patent

Mrasek

[11] Patent Number: 4,789,297
[45] Date of Patent: Dec. 6, 1988

[54] ENCLOSED WIND DEVICE MECHANISM WITH ECCENTRIC ROTOR SHAFT

[76] Inventor: Wilhelm Mrasek, Hermann-Daur-Weg 21, D-2190, Cuxhaven, Fed. Rep. of Germany

[21] Appl. No.: 917,090
[22] PCT Filed: Dec. 23, 1985
[86] PCT No.: PCT/DE85/00559
  § 371 Date: Oct. 10, 1986
  § 102(e) Date: Oct. 10, 1986
[87] PCT Pub. No.: WO86/03808
  PCT Pub. Date: Jul. 3, 1986

[30] Foreign Application Priority Data

Dec. 21, 1984 [DE] Fed. Rep. of Germany ....... 3446694
Jan. 2, 1985 [DE] Fed. Rep. of Germany ....... 3500012

[51] Int. Cl.⁴ .............................................. F03D 3/04
[52] U.S. Cl. ........................................ 415/2 R; 415/4; 416/88; 416/101; 416/109
[58] Field of Search ................. 416/88, 101, 109, 116, 416/240 A, 135 A; 415/2 R–4 R

[56] References Cited

U.S. PATENT DOCUMENTS

| | | | |
|---|---|---|---|
| 412,099 | 10/1889 | Keller | 416/101 |
| 1,080,657 | 12/1913 | Richter | 416/116 X |
| 1,293,262 | 2/1919 | Walker | 416/101 |
| 1,298,247 | 3/1919 | Muller | 415/2 R |
| 2,373,207 | 4/1945 | Touhey | 415/2 R X |
| 4,059,969 | 11/1977 | Awalt | 415/2 R X |
| 4,279,569 | 7/1981 | Harloff | 415/2 R X |
| 4,303,835 | 12/1981 | Bair | 416/240 A X |
| 4,619,585 | 10/1986 | Storm | 416/240 A X |

FOREIGN PATENT DOCUMENTS

| | | | |
|---|---|---|---|
| 2642570 | 3/1978 | Fed. Rep. of Germany | 416/240 A |
| 2750254 | 5/1979 | Fed. Rep. of Germany | 416/101 |
| 2800551 | 7/1979 | Fed. Rep. of Germany | 416/101 |
| 3246558 | 7/1984 | Fed. Rep. of Germany | 416/240 A |
| 402421 | 10/1909 | France | 416/240 A |
| 8478 | 11/1899 | Norway | 415/4 R |

*Primary Examiner*—Everette A. Powell, Jr.
*Attorney, Agent, or Firm*—Bell & Arkin

[57] ABSTRACT

A wind drive mechanism (10), comprising a housing (16) with a wind entry opening (25) and a wind outlet opening (26). In the housing (16) a rotor (30) is arranged with a vertically extending rotor shaft (31). The rotor shaft (31) is offset from the middle and is provided with rotor rotating arms (37). The rotor rotating arms (37) are slidable relative to the rotor shaft (31). Sails (32) are fixed to the rotor shaft (31) and to the take-up shafts (35), the sails being rolled in and out during each rotation of the rotor (30) with the help of electric motors (29).

12 Claims, 6 Drawing Sheets

FIG. 5  Section A-A
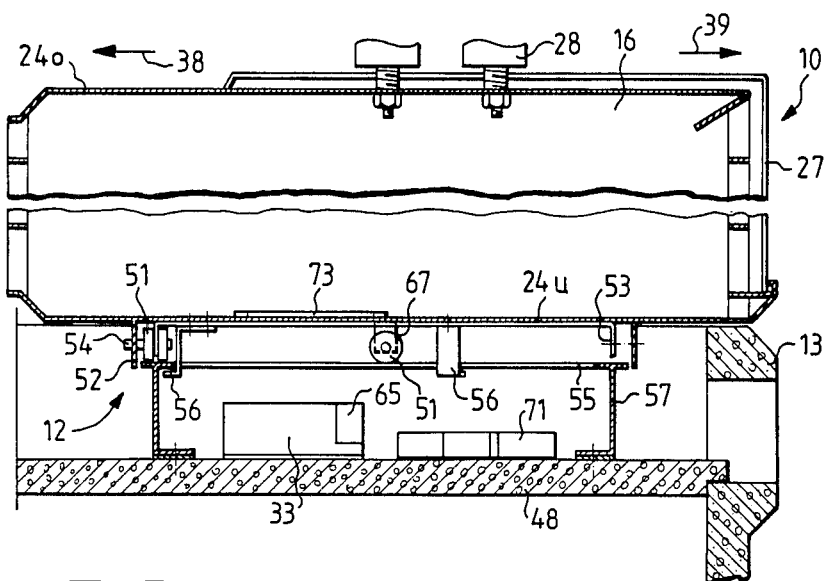
FIG. 6
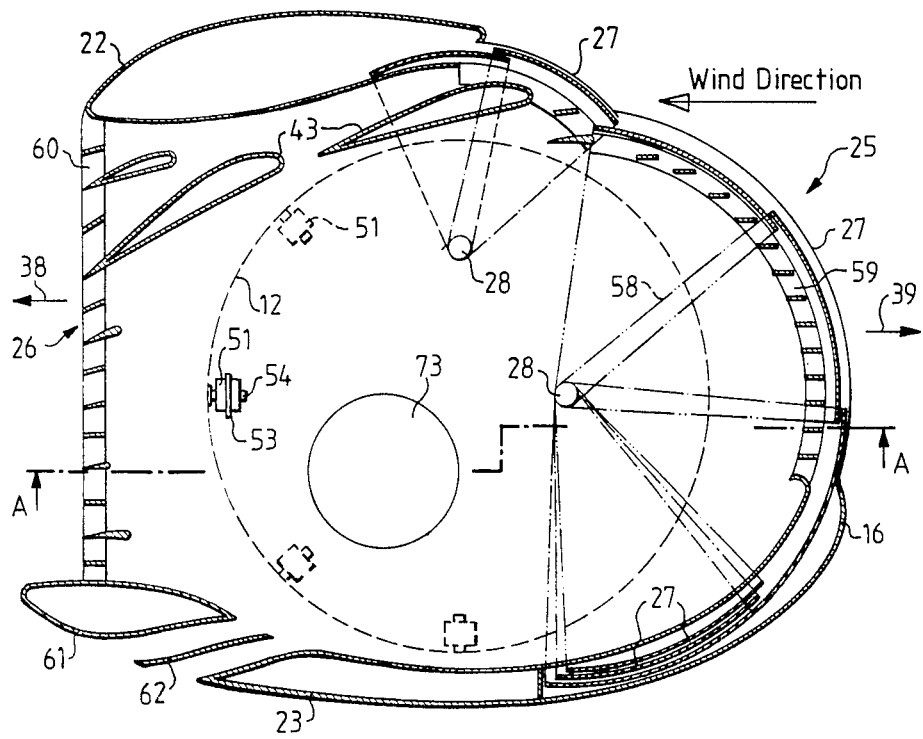

FIG. 7 Section B-B
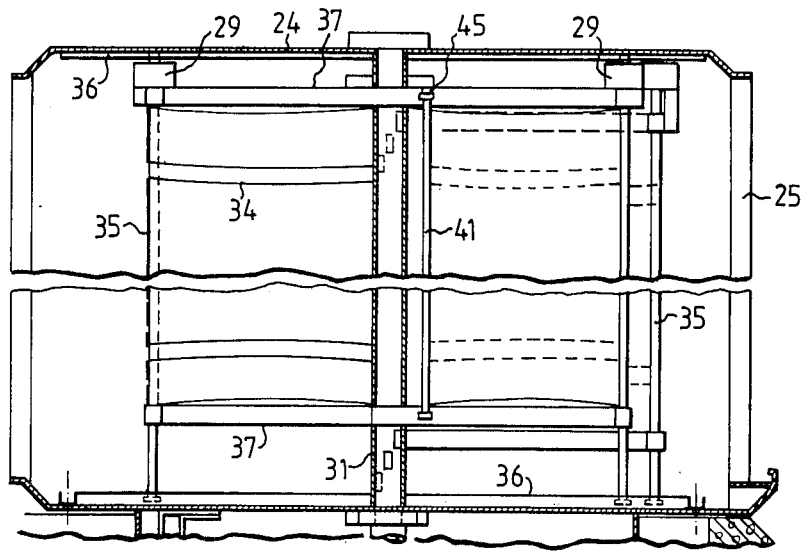
FIG. 8
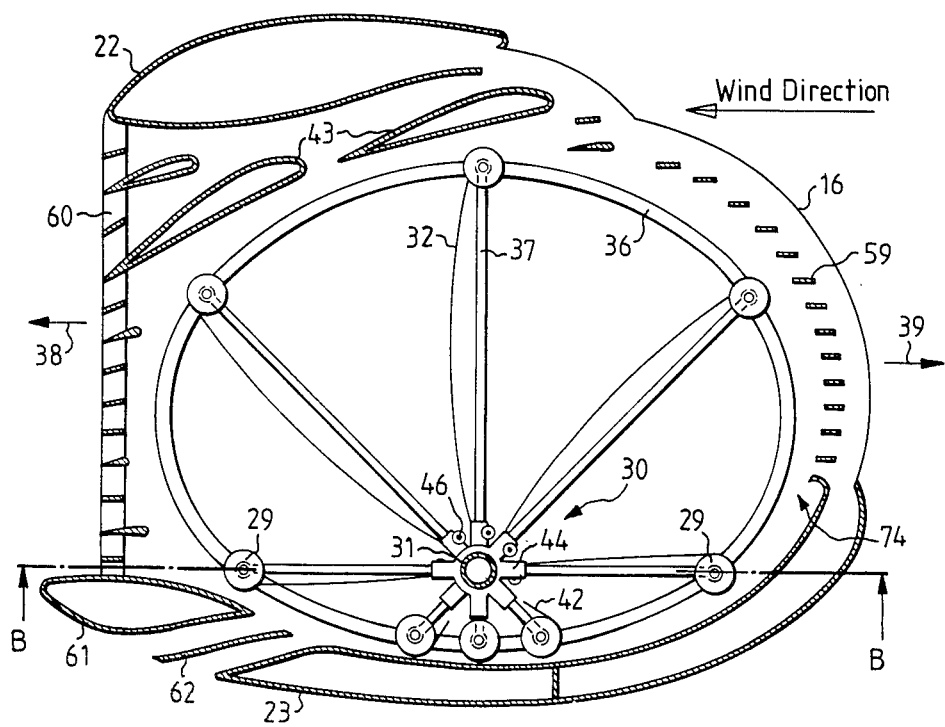

Section C-C

Wind Pressure

ENCLOSED WIND DEVICE MECHANISM WITH ECCENTRIC ROTOR SHAFT

The invention relates to a wind drive mechanism with a housing, in which a vertical rotor is rotatable about an eccentrically located rotor shaft and in which means associated with the vertical rotor are displaceable relative to the rotor shaft and can be acted upon by the wind.

With such a wind drive mechanism, as is described for example in German Laid-Open Specification (DE-OS) No. 2,800,551, the wind energy existing in nature can be converted into technologically utilizable energy, for example electrical energy. Decisive for the economic feasibility of such a wind drive mechanism is its efficiency and its utilizability. The utilizabilities should be considered from, among other things, aesthetic and town planning points of view. Frequently, a decentral energy supply is required which, however, with known wind drive mechanisms often fails due to visual conspicuousness since the larger such an installation is the more it is conspicuous and unaesthetic.

The problem of the present invention to provide a wind drive mechanism of the initially described type which can be inconspicuously installed decentrally and according to the building regulations and which has a good efficiency.

This problem is solved in that the means which can be acted upon by the wind are formed as sails which can be wound in and out during the rotation of the vertical rotor, the rotor shaft is provided at both ends with a rotor head for receiving rotor rotating arms, the rotor rotating arms are slidable through the rotor heads and the magnitudes of the areas of the sails which can be acted upon by the wind can be determined by the rotor rotating arms. By these measures, a large sail surface can be acted upon by the incoming wind. During return travel, this area is reduced and, thereby, the oppositely directed wind resistance is reduced. The installation can therefore be carried out with a good efficiency in a relatively small construction and inconspicuously decentral installation.

For improving the aerodynamic effect, it is provided that the housing has an asymmetrical profile, which comprises a long housing outer wall and a short housing outer wall and the rotor shaft extends perpendicular to the profile in the housing. By these measures, a suction is produced at the wind outlet opening, which effects a further improvement of the efficiency of the sails.

Wind energy is always available with different intensities, so for regulating the wind amount acting on the wind drive mechanism it is provided that the housing has a wind entry opening which can be closed by protective shutters and a wind outlet opening provided with baffles. By the baffles, furthermore, the suction which occurs in the vicinity of the wind outlet opening is variable, it being provided that the protective shutters are adjustable by adjustment arms and the adjustment arms are driven by adjustment motors, and that the protective shutters extend vertically and are arranged overlapping one another in the wind entry opening of the housing.

For trouble-free guiding of the means acted upon by the wind, it is provided that the rotor rotating arms are guided horizontally between gear wheels and guide rollers and vertically between lower guide rollers and upper guide rollers in the rotor head housings of each rotor head, it being provided, for avoiding tilting and bracing of the sails, that the gear wheels of the upper and lower rotor heads are connected by connecting shafts so as to run in synchronism with one another. For optimum utilization of the incoming wind energy, it is provided that the rotor arms at their outer ends, facing away from the rotor heads, are provided with wind-in devices for winding in and out the sails stretched between the rotor shaft and the take-up shafts, and that the wind-in devices are associated with fast-running electric motors which quickly alter their directions of rotation and the wind-in devices are provided with vertically extending take-up shafts.

In order to be able to correctly position the wind drive mechanism even at low wind speed, it is provided that the housing is provided with rollers and is rotatably arranged on a turntable and one of the rollers is associated with an adjustment motor for rotating the housing, it being provided that the housing is associated with a wind wheel and the adjustment motor rotating the turntable is controlled by the wind wheel.

Further advantageous measures are described in the remaining sub-claims. The invention is illustrated in the accompanying drawing and described in greater detail below:

FIG. 5 shows the housing of a wind drive mechanism according to FIG. 1, in side elevation, along the section line A—A in FIG. 6;

FIG. 6 shows the plan view of the housing of a wind drive mechanism according to FIG. 5, in section;

FIG. 7 shows the housing of a wind drive mechanism according to FIG. 1, in side elevation, with detailed illustration of the sail arrangement along section B—B in FIG. 8;

FIG. 8 shows the plan view of the housing of a wind drive mechanism according to FIG. 7, with a detailed illustration of the sail arrangement and the relatively movable rotor rotary arms;

Figure 1:
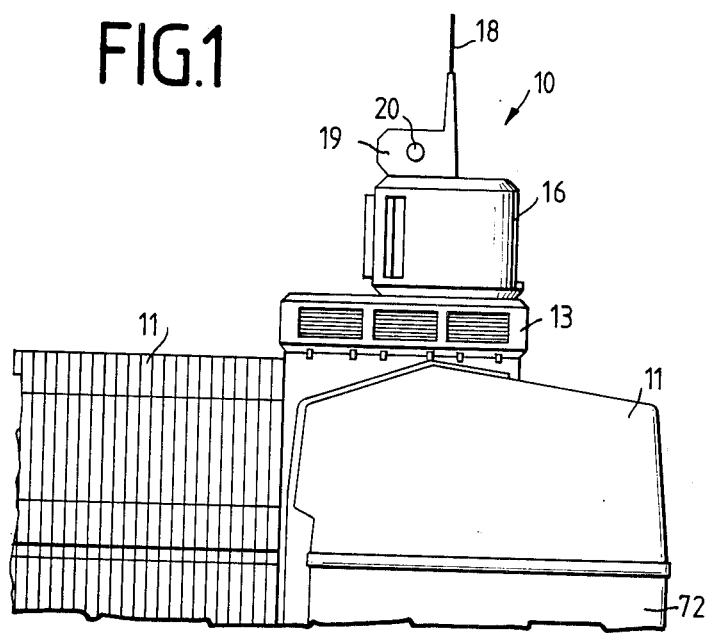
FIG. 1 shows the side elevation of a remote wind drive mechanism installed on a building.
Figure 2:
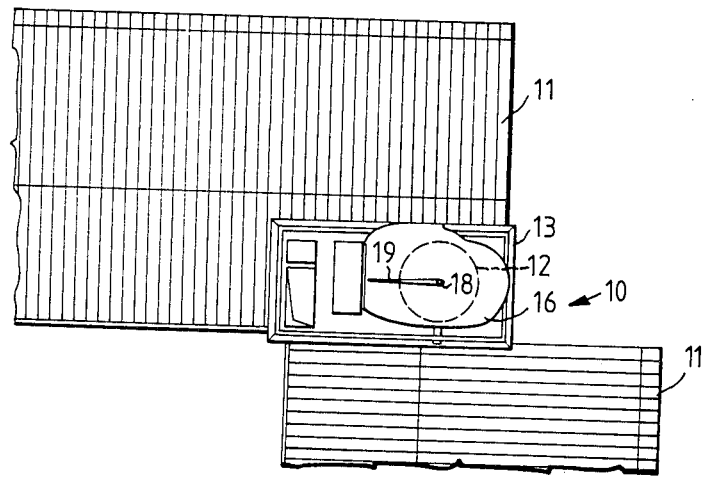
FIG. 2 shows the plan view of a wind drive mechanism as shown in FIG. 1.

The wind drive mechanism at 10 illustrated in FIGS. 1 and 2 comprises essentially a housing 16 with a topmast 18, which is connected by a parapet element 13 with a roof or staircase head 11. The topmast 18, about which a wind vane mechanism 19 is pivotable, is mounted on the housing 16. With the help of the wind vane mechanism 19, the entire housing 16 is rotatable on a turntable 12 about its own axis. On the wind vane mechanism 19 there is located an easily running wind wheel 20, which is responsive even to light winds. It is connected with an adjustment motor 67—illustrated in FIG. 5—with which the housing 16 can be rotated on the turntable 12.

Figure 3:
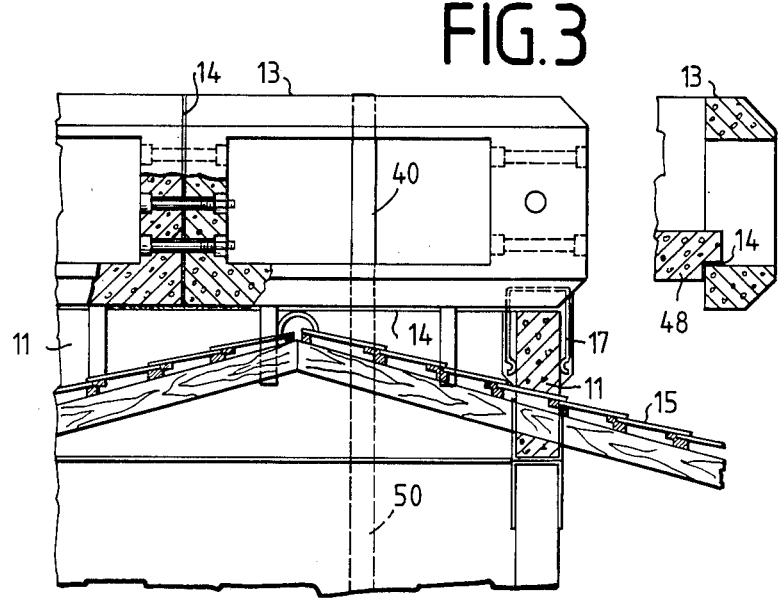
FIG. 3 shows a section through the roof construction and the parapet element for receiving a wind drive mechanism, in side elevation.
Figure 4:
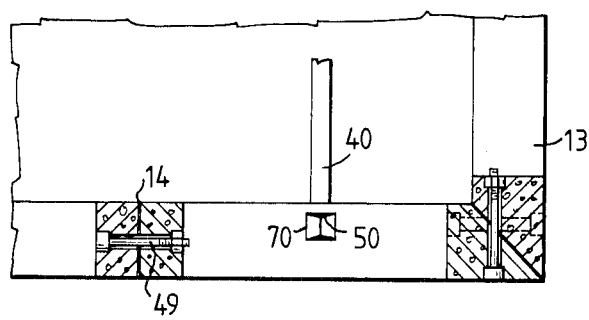
FIG. 4 shows a plan view, taken in section, of the parapet element according to FIG. 3.

As shown by FIGS. 3 and 4, the parapet element 13 is connected through a resilient intermediate layer 14 to the roof or staircase head 11 of a building 72. The parapet element 13 comprises a plurality of concrete prefabricated components, in which connecting clamps 17 are cast. The connecting clamps 17 serve to secure the parapet elements 13 to the roof or staircase head 11 above the roof covering 15. The individual prefabricated elements of the parapet element 13 are connected together by connecting elements 49. Tie rods or bolts can be employed, for example, as the connecting elements 49. Resilient intermediate layers 14 are likewise provided between the individual concrete prefabricated components. For anchoring the wind drive mechanism 10 to the roof or staircase head 11 or to a prefabricated deck component 48, an anchoring element 50 is provided, which in the form of an I-section steel beam is guided in a wall slot 70 vertically through the parapet element 13 and the entire building 72. For reinforcing the parapet element 13, a transversely extending reinforcement element 40, connected with the anchoring element 15, is provided; the reinforcement element 40 may likewise be of steel.

As FIG. 5 shows, a turntable 12 is arranged in the parapet element 13. The turntable 12 rests on a prefabricated deck component 48 of the parapet element 13 and is fixedly connected thereto. The turntable 12 is circularly formed and comprises essentially a vertically standing turntable web 57 with a running surface 55. A plurality of rollers 51 run on the running surface 55. The rollers 51 are provided with roller shafts 54 and held in outer roller guides 52 and inner roller guides 53. The roller guides 52 and 53 are fixedly connected to the lower housing outer wall 24u of the housing 16. In order to prevent tilting of the housing 16 from the turntable 12, the inner, substantially vertically extending roller guides 53 are provided with horizontal, radially outwardly directed securing lugs 56, which engage with a small spacing beneath the turntable running surface 55. One of the rollers 51 is associated with an adjustment motor 67, with which the housing 16 can be rotated on the turntable 12 into the correct wind direction. The adjustment motor 67 then obtains its control pulses from the above-described easily-running wind wheel 20. In this way, the housing 16 can also be rotated into the wind when the wind strength is not sufficient to rotate the entire housing with the help of the above-described wind vane mechanism 16. The electrical energy required by the adjustment motor can be stored, for example, in accumulators 71. The accumulators 71 may, for example, be accommodated in the interior of the turntable 12 beneath the housing 16. In this interior, also, an electrical generator 33, driven by the wind drive mechanism 10 through a multi-stage gearing 65, can be accommodated. In order to access this interior, the lower housing outer wall 24u is provided with an access cover 73.

As FIG. 6 shows, the housing 16 has, in plan view, an asymmetrical profile with a long housing wall 22 and a short housing wall 23. The two housing walls 23 and 24 which stand substantially vertically, are covered at the top by a substantially horizontally extending housing wall 24o and, at the bottom, by a lower housing wall 24u. Between the housing outer walls 23 and 24 there is provided a wind entry opening 25 and a wind outlet opening 26 lying opposite thereto. With the help of the wind vane mechanism 19 or the wind wheel 20, the wind entry opening 25 is always rotated relative to the wind direction so that it assumes the weather side 39 and the wind outlet opening 26 assumes the lee side 38 of the housing 16. In the wind inlet opening 25, inlet baffles 59 are arranged and outlet baffles 60 are arranged in the wind outlet opening 26.

Near the inlet and outlet baffles 59 or 60, further baffles 53 and 62 are provided in the housing, which together with the long housing outer wall 22 ensure a partial vacuum at the housing rear wall 61. By this partial vacuum there is produced, in the vicinity of the wind outlet opening 26, a suction by which the most satisfactory flow relationships are maintained in the housing 16. In order to be able to protect the interior of the housing 16 against damage during wind or storms becoming stronger, the wind entry opening can be partially to fully closed by a protective shutter 27. The protective louver blind 27 are displaceable, overlapping one another in front of the wind inlet opening 25, on the upper and lower housing outer walls 24o and 24u with the help of adjustment arms 58. The adjustment arms 58 are pivotable separately or together with the help of electrically driven adjustment motors 28.

As FIGS. 7 to 8 show, in the housing 16 a rotor 30 is arranged with a rotor shaft 31 extending substantially vertically, and located offset from the center of the housing. The rotor shaft 31 is provided at each of its opposite ends with a rotor head 44, through which the rotor rotating arms 37 are relatively slidable. On the rotor shaft 31, sails 32 are fixed. These sails 32 are fixed at their outer sides, facing away from the rotor shaft 31, to take-up shafts 35. The take-up shafts 35 are provided with electric motors 29, which run fast and have alternating directions of rotation. The take-up shafts 35 are connected at the top and bottom with the rotor rotating arms 37 and are relatively displaceable in position with respect to the rotor shaft 31. The sails 32 can be rolled in or out about the take-up shafts 35. The sails 32 extend, during each rotation, in a rolled up condition 42 immediately past the rotor head 44. The take-up shafts 35 run in channel tracks 36. The upper housing outer wall 24o and the lower housing outer wall 24u are each associated with a channel track 36. The channel tracks 36 are formed approximately elliptically. For reinforcing the sails 32, steel wire mesh strips 34 are associated therewith. The steel wire mesh strips 34 extend substantially parallel to one another and are radially outwardly directed.

Figure 9:
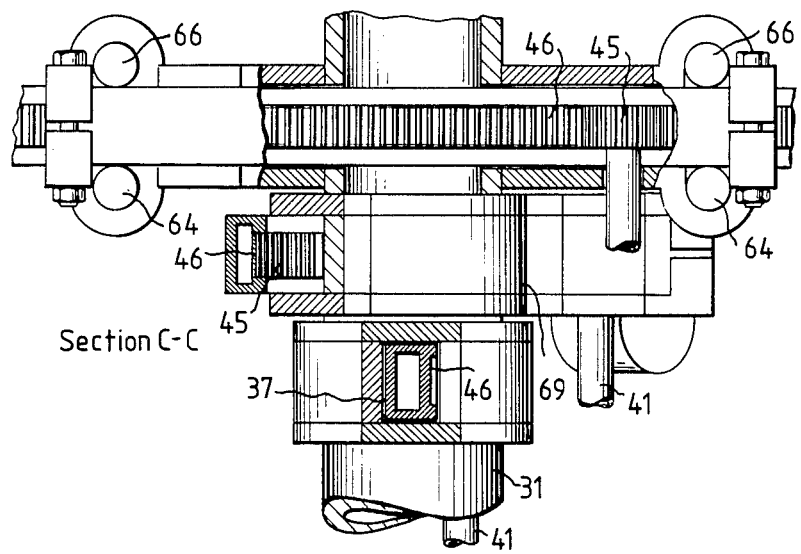
FIG. 9 shows the side elevation of a rotor head of a wind drive mechanism according to FIG. 1, along section C—C of FIG. 10.
Figure 10:
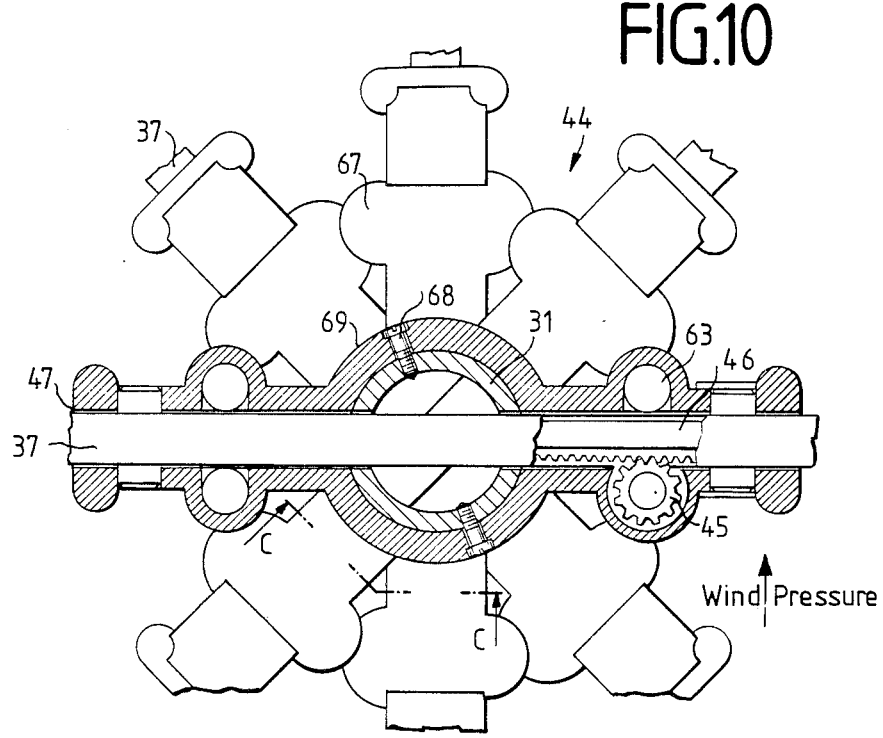
FIG. 10 shows the plan view of the rotor head according to FIG. 9.

The rotor rotating arms 37 are, as FIGS. 9 and 10 show, provided at one side with a toothing 46, in which gear wheels 45 mesh, which are associated with the rotor head 44. The gear wheels 45 are connected together by connecting shafts 41. The connecting shafts 41 extend substantially parallel to the rotor shaft 31 and to the take-up shafts 35, vertically in the housing 16. The rotor heads 44 illustrated in FIGS. 9 and 10 comprise a rotor head housing 69 with substantially horizontally extending rotating arm guides 47 therethrough. In the illustrated embodiment, a total of four rotor rotating arms 34 are arranged extending through the rotor head housing 69. The rotor rotating arms 37 are offset in height relative to one another, so that they do not engage one another. They are slidable in the rotor head housing 39 or in the rotary arm guides 47 and cross one another at an angle of 45°.

In the toothing 46 engage the gear wheels 45, which are associated with opposed guide rollers 63. To counteract vertical tilting, the rotor rotating arms 37 with the upper guide rollers 66 and the lower guide rollers 64 are supported in the rotating arm guides 47 of the rotor head housing. The rotor head housings 69 are connected by securing elements 68, for example grub screws, with the rotor shaft 31. The rotor shaft 31, in turn, acts on a gearing 65. The gearing 65 is arranged below the housing 16 in the vicinity of the generator 33 and is constructed in multiple stages, in order to be able to drive the generator 33 even at low speeds of rotation.

Figure 11:
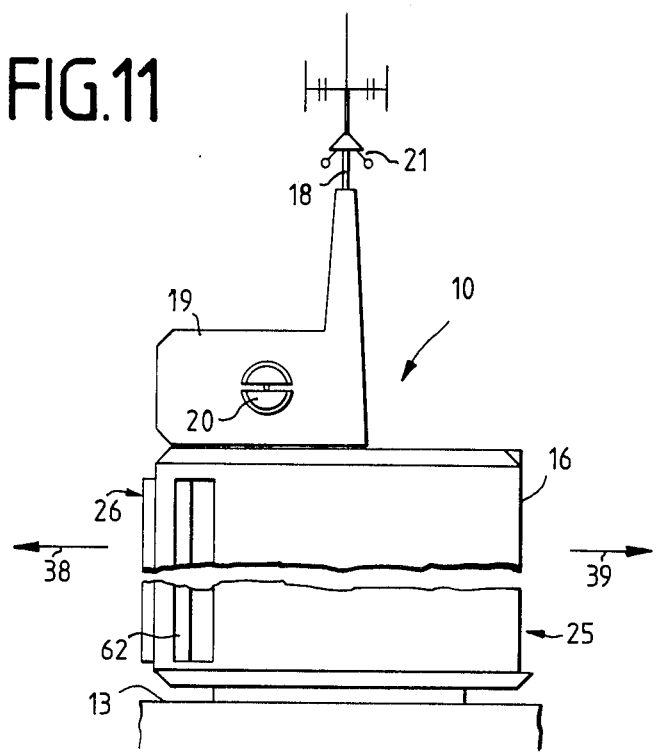
FIG. 11 shows the side elevation of the housing of a wind drive mechanism according to FIG. 1, with a topmast.
Figure 12:
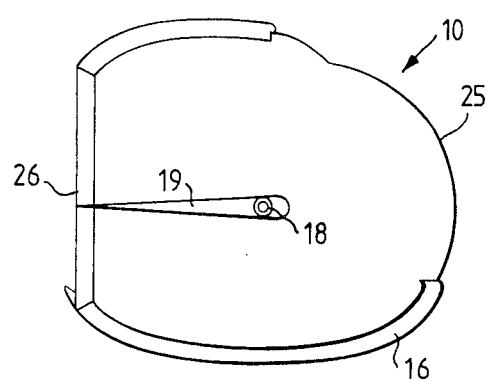
FIG. 12 shows the plan view of the housing according to FIG. 11.

In FIGS. 11 and 12, the wind drive mechanism 10 is shown again in detail in side elevation and in plan view. As FIG. 11 shows, the topmast 18 is provided with a wind vane mechanism 19, which is also associated with an easily running wind wheel 20. Above the wind vane mechanism 19 there is arranged a centrifugal regulator 21, by which the wind speed can be measured and the inlet side of the wind entry opening 25 can be regulated with the help of the protective shutter 27. Thus, the wind entry opening 25 of the housing 16 can be adjusted from "fully open" for light wind to "fully closed" during severe storms.

With reference to the above described embodiment, the functioning of the invention is described in the following:

With the help of the wind vane 19 or the easily running wind wheel 20 and an adjustment motor 67 regulated thereby, the housing 16 of the wind drive mechanism 10 is rotated into the wind so that the wind entry opening 25 represents the weather side 39. With the help of further adjustment motors 28, the protective shutter 27 is opened in accordance with the prevailing wind strength. The regulation is thereby effected by a centrifugal controller 21, associated with the topmast 18.

In the housing 16 between the rotor shaft 31 and the winding shafts 35, sails 32 are stretched. The required sail surfaces are determined by the spacing of the rotor rotating arms 37 with respect to the rotor heads. The rotor rotating arms 37 are rotatable about a rotor shaft 31 offset from the center and extending vertically, and at their outer ends are provided with electric motors 29. At each rotation, the sails 32 are rolled out by the fast-running electric motors 29, which quickly alter their directions of rotation, while passing in the direction towards the wind entry opening 25 and tightened and, on return, are rolled up again. Such a sail, in its rolled up condition 42, presents, during the return travel taking place opposite to the wind direction, a small impact surface for the wind, whereby the efficiency of the rotor 30 can be substantially increased. Furthermore, the rotor shaft 31 and the sails 42 rolled up with it are located in the lee 74 of the wind entry opening 25. The rotor shaft 31 acts, in known manner, through a multi-stage gearing 65 on a generator. With the help of the multi-stage gearing 65, a low speed of rotation of the rotor 30—and thus a small wind amount—can be utilized.

I claim:

1. A wind drive mechanism, comprising:
    a housing,
    a vertical rotor therein which is rotatable about an eccentrically located rotor shaft,
    upper and lower rotor heads provided at each end of said rotor shaft,
    a plurality of horizontally disposed upper rotor arms slidable through openings in said upper rotor head,
    a plurality of horizontally disposed lower rotor arms slidable through openings in said lower rotor head,
    each upper arm being located above a respective lower arm and being slidable in correspondence therewith,
    each said upper and lower rotor arms being provided with teeth which mesh with gear means carried by said upper and lower rotor heads,
    a plurality of sails each located between respective upper and lower rotor arms, and each connected between the upper and lower rotor heads and
    take-up shafts extending between the outer ends of respective upper and lower rotor arms, the magnitude of the sail area being adjustable by movement of said rotor arms through said rotor heads.

2. A wind drive mechanism according to claim 1, wherein the housing has an asymmetrical profile, which comprises a perpendicular long housing outer wall, a perpendicular short housing outer wall and horizontal deck surfaces, and the rotor shaft extends perpendicularly between the deck surfaces in the housing.

3. A wind drive mechanism according to claim 1, wherein the rotor arms are provided at their outer ends, facing away from the rotor heads, the wind-in devices for winding in and out the sails, stretched between the rotor shaft and the take-up shafts, the wind-in devices being associated with fast-running electric motors capable of quickly altering their direction of rotation.

4. A wind drive mechanism according to claim 1, including a housing having a wind entry opening which can be closed by protective shutters and a wind outlet opening provided with baffles, wherein the protective shutters are adjustable by adjustment arms and the adjustment arms are driven by adjustment motors.

5. A wind drive mechanism according to claim 4, wherein the protective shutters extend vertically and are arranged overlapping one another in the wind entry opening of the housing.

6. A wind drive mechanism according to claim 1, wherein the upper and the lower rotor arms are each guided horizontally between gear wheels and guide rollers and vertically between lower guide rollers and upper guide rollers in the rotor head housings of each rotor head.

7. A wind drive mechanism according to claim 1, wherein the gear wheels of the upper and lower rotor heads are connected by connecting shafts so as to run in synchronism with one another.

8. A wind drive mechanism according to claim 2, wherein the wind-in devices are connected through a gearing with the take-up shafts.

9. A wind drive mechanism according to claim 2, wherein the wind-in devices run on approximately elliptical channel tracks associated with the horizontal upper and lower deck surfaces.

10. A wind drive mechanism according to claim 1, wherein the housing is provided with rollers and is rotatably arranged on a turntable and one of the rollers is associated with an adjustment motor for rotating the housing.

11. A wind drive mechanism according to claim 10, wherein a wind wheel is associated with the housing and the adjustment motor rotating the turntable is driven by the wind wheel.

12. A wind drive mechanism according to claim 1, wherein the housing is connected via a parapet element to a roof or staircase head and the parapet element is anchored to the building by means of a connecting element extending substantially vertically through the entire building.

* * * * *